A. Peteler,
Ship Ventilator.
No. 1,654. Reissued Apr. 19, 1864.
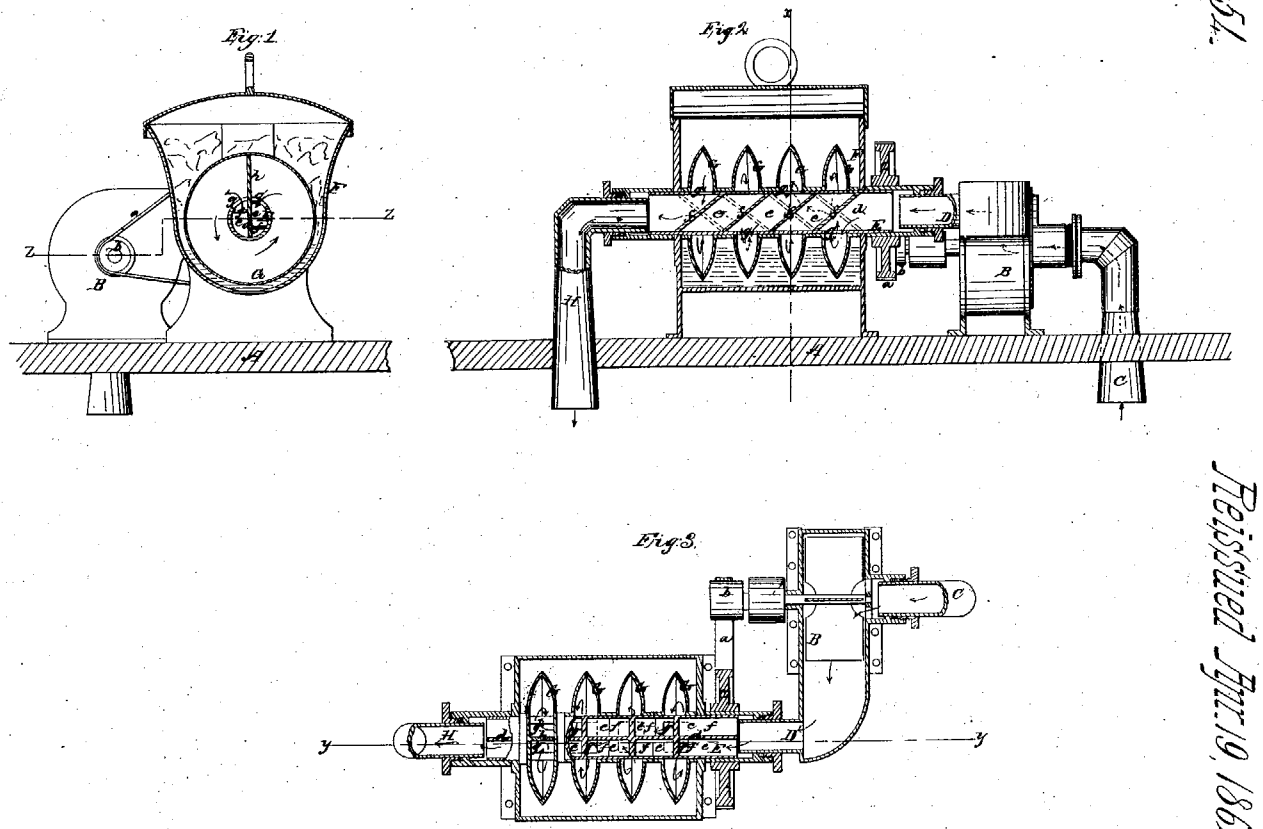
Witnesses.
Wm. Gumpert.
C. W. Crosby
Inventor.
Alois Peteler
N. PETERS, PHOTO-LITHOGRAPHER, WASHINGTON, D. C.

UNITED STATES PATENT OFFICE.

ALOIS PETELER, OF NEW BRIGHTON, NEW YORK.

IMPROVEMENT IN APPARATUS FOR DISINFECTING FOUL AIR IN VESSELS.

Specification forming part of Letters Patent No. 31,996, dated April, 9, 1861; Reissue, No. 1,654, dated April 19, 1864.

*To all whom it may concern:*

Be it known that I, ALOIS PETELER, of New Brighton, in the county of Richmond and State of New York, have invented a new and Improved Apparatus for Cooling and Disinfecting the Air in Rooms, Vessels, and other Closed Spaces; and I do hereby declare that the following is a full, clear, and exact description of the same, reference being had to the accompanying drawings, forming a part of this specification, in which—

Figure 1 represents a longitudinal vertical section of my invention, the line *x x*, Fig. 2, indicating the plane of section. Fig. 2 is a longitudinal vertical section of the same, taken in the plane indicated by the line *y y*, Fig. 3. Fig. 3 is a horizontal section of the same, the plane of section being indicated by the line *z z*, Fig. 2.

Similar letters of reference in the three views indicate corresponding parts.

This invention consists in combining with a refrigerating chamber and room, vessel, or other closed space, the air of which is to be cooled or disinfected, an air-conduit provided with a fan or other blower, and arranged in relation to the ice or freezing-mixture contained in said refrigerating-chamber in such a manner that the air while passing through said conduit will become cooled and flow into the room, vessel, or other closed space without coming in contact with the ice or freezing mixture, and that the air contained in said room, vessel, or other closed space can be passed once or several times through said conduit until its temperature is brought down to the desired degree.

The invention consists, further, in the peculiar arrangement of a series of revolving drums on a hollow shaft, the interior of which is divided into several channels, in combination with the refrigerating-chamber, and with or without the fan-blower, in such a manner that the current of air created by the changes of its temperature or by the fan-blower, as the case may be, is compelled to make a long circuit in the interior of the refrigerating-chamber, and that its temperature is reduced considerably before it is allowed to leave said chamber.

To enable others skilled in the art to make and use my invention, I will proceed to describe it.

A represents the deck or any other part of a vessel, or the top, side, or bottom of a room or other space, the air in which is to be cooled. Secured to this deck is the fan-blower B, to which the air is supplied through the pipe C, which extends down into the space below the deck, its lower end being enlarged, or bell-shaped, so that the air passes readily up through it. Instead of the fan-blower, however, any other device capable of sucking up the air from one side and forcing it out toward the other might be employed, or the fan-blower may be dispensed with, and the motion of the air effected simply by the changes in its temperature. The current of air emanating from the pipe D enters the hollow shaft E, which has its bearings in the ends of a chamber or box, F, and to which a rotary motion is imparted by means of a belt, *a*, passing over pulleys *b c*. The interior of this shaft is divided in two halves by a partition, *d*, passing through its longitudinal center, and each of these halves is again divided into several compartments or channels, *e*, by means of a series of inclined partitions, *f*, that are secured in the interior of the hollow shaft in a position as clearly shown in Figs. 2 and 3 of the drawings. Through these channels the air passes into the hollow drums G, which are rigidly attached to the hollow shaft E, and which communicate with the interior of said shaft each by means of two apertures, *g g'*, situated on opposite sides of the central partition, *d*, so that one aperture leads to one and the other to the other half of the interior of the shaft. The interior of each drum is furnished with an abutment, *h*, situated between the two apertures *g g'* and exactly in line with the central partition, *d*, as clearly shown in Fig. 1 of the drawings. Furthermore, these drums are so arranged that the apertures *g g'*, which lead from the first, third, fifth, &c., drum to the interior of the shaft, are on one side, and those apertures which form the communication between the interior of the shaft and the second, fourth, sixth, &c., drum are on the opposite side of the shaft E, as clearly shown in Fig. 2. By these means the air as it passes from the fan-blower into the hollow shaft on one side of the central partition, *d*, enters the first drum through the aperture *g*, and it has to make a complete circuit through this drum before it reaches the aperture *g'*, on the opposite side of the partition *d*, as clearly shown in Fig. 1 by the arrows indicating the current of the air. Through this aperture the air passes out and through one of the channels *e*, formed by the inclined partitions *f*, in the interior of the shaft, to the aperture leading from the shaft to the second drum, where it is again compelled by the abutment in said drum to make a complete circuit in order to reach the aperture *g**, Fig. 2, leading from this drum to the channel *e**, through which it passes to the third drum, and so forth, until it reaches the last drum, from which it is conducted through the tube H back into the space below the deck A.

The chamber F, in which the drum G and shaft E rotate, is filled with ice or some freezing composition, and the air, in making its circuit through the several drums and through the shaft, is kept for a considerable time in contact with their cold sides, all of which ought to be made of sheet copper or some other good conductor of heat. By these means the temperature of the air is considerably reduced, and on passing back into the space below, being the heaviest, sinks down to the bottom, and a fresh supply of warm air passes through the apparatus until after a short time the temperature of the air below the deck is reduced to the desired degree. It will be readily seen that by these means the air of an infected vessel can be completely disinfected without allowing any portion of the infected air to escape to the open atmosphere, which is of peculiar advantage for vessels infected by yellow fever or other contagious diseases, which are liable to spread from the vessel to the neighboring shores in case the infected air is allowed to escape from the vessel to the open atmosphere.

It is obvious that with my apparatus the disinfection can be effected with equal facility before and after the cargo has been removed, and if an infected vessel arrives in port it is only necessary to close down the hatchways and to apply my apparatus, and in the course of half a day or day the temperature of the air in the entire vessel can be reduced to such a point that the previously-infected air is rendered perfectly harmless, and the cargo can now be removed without any danger to the men employed in doing this work or to the people in the neighborhood.

This apparatus may also be used with advantage to reduce the temperature of the air in rooms and buildings, or to disinfect the air in the same, and if it is applied to a small room or to the provision chamber of an ordinary refrigerator the blower can be dispensed with and the motion of the air made dependent entirely upon the natural draft produced by the changes of temperature to which the air is subjected during the various stages of its circuit.

If desired, this apparatus may also be used advantageously for freezing bodies in coffins.

What I claim as new, and desire to secure by Letters Patent, is—

1. Disinfecting vessels, rooms, or other closed spaces by forcing the air contained therein through contracted passages which are reduced in temperature by means of a cooling agent confined within a chamber without contact with the external air or with that which it is desired to disinfect, substantially as described.

2. The air conduit C D H, or its equivalent, applied in combination with a fan or other blower, B, a refrigerating chamber, F, and with the deck or other part, A, of a vessel or other closed space, substantially in the manner herein specified, so that the air, while passing through said conduit, will become cooled and flow into said vessel or other closed space without coming in contact with the ice or freezing mixture contained in the ice-chamber.

3. The arrangement of the rotary hollow shaft E with chambers *e*, apertures *g g'*, and drums G, with abutments *h*, in combination with the fan-blower B, or its equivalent, tubes C and H, and with the refrigerating-chamber F, constructed and operating in the manner and for the purpose substantially as herein specified.

ALOIS PETELER.

Witnesses:
JAS. P. HALL,
GEO. W. REED.